United States Patent [19]
Kim

[11] Patent Number: 5,689,312
[45] Date of Patent: Nov. 18, 1997

[54] BLOCK MATCHING MOTION ESTIMATION METHOD

[75] Inventor: Sang-Ho Kim, Seoul, Rep. of Korea

[73] Assignee: Daewoo Electronic Co., Ltd., Seoul, Rep. of Korea

[21] Appl. No.: 578,768

[22] Filed: Dec. 26, 1995

[30] Foreign Application Priority Data

Dec. 30, 1994 [KR] Rep. of Korea ............... 94-39976

[51] Int. Cl.$^6$ ........................................... H04N 7/30
[52] U.S. Cl. ................................. 348/699; 348/420
[58] Field of Search ........................ 348/384, 390,
348/400–402, 405, 407, 409–413, 415,
416, 420, 429, 699; 382/232, 236, 238;
H04N 7/30, 7/137

[56] References Cited

U.S. PATENT DOCUMENTS

| | | | |
|---|---|---|---|
| 4,777,530 | 10/1988 | Kondo | 348/699 |
| 4,901,149 | 2/1990 | Fernando et al. | 348/429 |
| 4,972,260 | 11/1990 | Fujikawa et al. | 348/405 |
| 5,453,801 | 9/1995 | Kim | 348/699 |
| 5,561,475 | 10/1996 | Jung | 348/699 |
| 5,596,370 | 1/1997 | Jung | 348/416 |

*Primary Examiner*—Richard Lee
*Attorney, Agent, or Firm*—Anderson Kill & Olick P.C.

[57] ABSTRACT

A method for detecting motion vectors comprises the steps of (a) producing a plurality of differential search blocks, wherein each differential search block includes differential pixels defined by differences between luminance levels of the pixels in a search block and a mean luminance level of the pixels in the search block, (b) producing a multiplicity of differential candidate blocks, wherein each differential candidate block includes differential pixels defined by differences between luminance levels of the pixels in a candidate block and a mean luminance level of the pixels in the candidate block, (c) motion-estimating a search block with respect to each of the candidate blocks associated with a corresponding search region to produce displacement vectors corresponding thereto and motion-estimating a differential search block with respect to each of the differential candidate blocks associated with a corresponding search region to produce error functions corresponding thereto, and (d) choosing a minimum error function to define a displacement vector corresponding to the minimum error function as a motion vector for the search block.

3 Claims, 1 Drawing Sheet

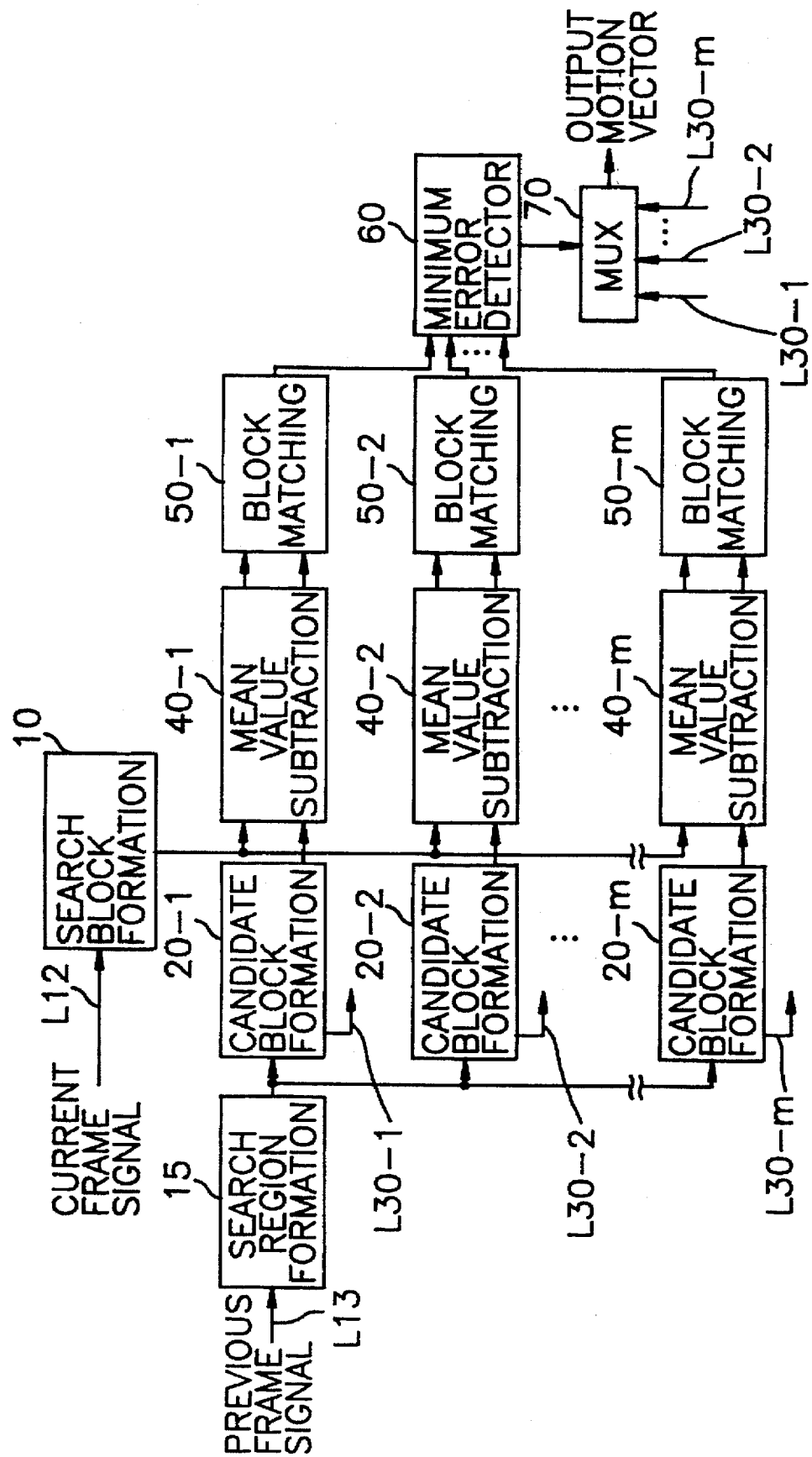

BLOCK MATCHING MOTION ESTIMATION METHOD

FIELD OF THE INVENTION

The present invention relates to a block matching motion estimation method for use in a video signal encoding; and, more particularly, to an improved motion estimation method for enhancing the coding efficiency of a video signal.

DESCRIPTION OF THE PRIOR ART

When an image signal comprising a sequence of image "frames" is expressed in a digital form, substantial amounts of data are generated for transmission, especially in the case of a high definition television system. Since, however, the available frequency bandwidth of a conventional transmission channel is limited, in order to transmit the substantial amounts of digital data through the limited channel bandwidth, it is inevitable to compress or reduce the volume of the transmission data.

The image signal can be normally compressed without seriously affecting its integrity because there usually exist certain correlationships or redundancies among some of the pixels in a single frame and also between those of neighboring frames.

Accordingly, most image signal encoding apparatus of prior art employ various compression techniques(or coding methods) built on the idea of utilizing or reducing the redundancies. Among various video compression techniques, the so-called hybrid coding technique, which combines temporal and spatial compression techniques together with a statistical coding technique, is known to be most effective.

In most hybrid coding techniques, current frame data is compressed first through the use of such temporal compression technique as motion estimation and compensation method, wherein the current frame data is predicted from previous frame data based on an estimation of the motion and differences between corresponding pixel data in the current and the previous frames. Such an estimated motion may be described in terms of two dimensional motion vectors representing displacements between the corresponding pixels in the previous and the current frames.

One of the motion estimation methods which have been proposed in the art is a block matching algorithm, wherein a current frame is divided into a plurality of equal-sized search blocks, a typical size of each search block ranging between 8×8 and 32×32 pixels, and the previous frame is divided into a corresponding number of large search regions, each search region being further divided into a multiplicity of candidate blocks of an identical size to that of the search block.

To determine a motion vector for a search block in the current frame, a similarity calculation is performed between the search block of the current frame and each of the candidate blocks included in a corresponding search region within the previous frame. An error function such as mean square error(MSE) function or mean absolute error(MAE) function is used to carry out the similarity calculation between the search block of the current frame and each of the candidate blocks in the search region. The MSE and MAE functions may be expressed as follows:

$$MSE = \frac{1}{H \times V} \sum_{i=1}^{H} \sum_{j=1}^{V} (I(i,j) - P(i,j))^2 \qquad \text{Eq. 1A}$$

$$MAE = \frac{1}{H \times V} \sum_{i=1}^{H} \sum_{j=1}^{V} |I(i,j) - P(i,j)| \qquad \text{Eq. 1B}$$

wherein H×V represents the size of a search block; I(i,j) represents the luminance level of a pixel at a pixel position (i,j) in the search block; and P(i,j) represents a luminance level of a corresponding pixel at a pixel position (i,j) in a candidate block displaced by a displacement vector D(k,l), where k and l are the x and y components of the displacement vector.

And a motion vector in a conventional block matching algorithm is chosen as the displacement vector between the search block and a candidate block that minimizes the error function. An error signal representing differences between the search block and the candidate block which yields the motion vector is then further compressed by using a transform technique which exploits spatial correlations existing in the error signal. One of such transform schemes is the DCT(Discrete Cosine Transform) technique. In the DCT technique, a block of, e.g., 8×8, pixels included in the error signal is transformed from a spatial domain to a frequency domain, resulting in a set of transform coefficients including one DC coefficient and a plurality of(e.g., 63) AC coefficients. The DC coefficient reflects an average intensity of the pixels in the block, whereas the AC coefficients represent intensities of the spatial frequency components of the pixels. Subsequently, these transform coefficients of the set are quantized by using an identical quantization step size. By processing such quantized transform coefficients with run length coding(RLC) and variable length coding(VLC) methods, the amount of data to be transmitted can be effectively compressed.

However, in such a conventional block matching algorithm, a motion vector of a search block determined based on the minimization of an error function may correspond to an error signal producing a small valued DC coefficient but entailing many AC coefficients of significant magnitudes, which may lower the coding efficiency of a video signal.

SUMMARY OF THE INVENTION

It is, therefore, a primary object of the present invention to provide an improved method for detecting motion vectors, which is capable of improving the coding efficiency of a video signal, wherein each of the motion vectors is determined in such a way that a resultant error signal produces AC coefficients of smaller magnitudes than those produced in the prior art methods, by measuring displacement vectors between a differential search block comprising differential pixels, each differential pixel having a difference value between a luminance level of each pixel in a search block and a mean luminance level of the pixels in the search block, and each of a plurality of differential candidate blocks comprising differential pixels, each differential pixel having a difference value between a luminance level of each pixel in a candidate block and a mean luminance level of the pixels in the candidate block.

In accordance with the invention, there is provided a method for detecting motion vectors between a current frame and a previous frame of video signals by employing a block matching motion estimation technique, wherein the current frame is divided into a plurality of search blocks of an identical size and the previous frame is divided into a corresponding number of search regions, each search region being divided into a multiplicity of candidate blocks of a size identical to that of the search block, which comprises the steps of:

(a) producing a plurality of differential search blocks, wherein each differential search block includes differential pixels, each differential pixel in said each differential search block having a difference value between a luminance level of each pixel in a search block and a mean luminance level of the pixels in the search block;

(b) producing a multiplicity of differential candidate blocks, wherein each differential candidate block includes differential pixels, each differential pixel in said each differential candidate block having a difference value between a luminance level of each pixel in a candidate block and a mean luminance level of the pixels in the candidate block;

(c) motion-estimating a search block with respect to each of the candidate blocks associated with a corresponding search region to produce displacement vectors corresponding thereto and motion-estimating a differential search block with respect to each of the differential candidate blocks associated with a corresponding search region to produce error functions corresponding thereto, each of the displacement vectors representing displacements between the pixels in the search block and their corresponding pixels in each of the candidate blocks, and each of the error functions being calculated based on differences between luminance levels of the differential pixels in the differential search block and those of their corresponding differential pixels in each of the differential candidate blocks; and (d) choosing a minimum error function to define a displacement vector corresponding to the minimum error function as a motion vector for the search block.

BRIEF DESCRIPTION OF THE DRAWING

The above and other objects and features of the present invention will become apparent from the following description of preferred embodiments given in conjunction with the accompanying drawing, which is a schematic block diagram of a block matching motion estimator in accordance with the invention.

DETAILED DESCRIPTION OF THE PREFERRED EMBODIMENTS

Referring to the drawing, there is shown a block diagram of a block matching motion estimator in accordance with the present invention.

A current frame signal is provided through a line L12 to a search block formation section 10 that divides the current frame into a plurality of search blocks of an identical size, each comprising H×V pixels, and provides pixel data of a current search block to mean value subtraction sections 40-1 to 40-m. Actually, pixel data of the search blocks is provided to the mean value subtraction sections on a block-by-block basis according to a predetermined sequence.

Meanwhile, a previous frame signal stored in a memory (not shown) is fed through a line L13 to a search region formation section 15 that divides the previous frame into as many search regions as the search blocks of the current frame, wherein each search region includes m number of candidate blocks of a size identical to that of the search block. Data of a search region corresponding to a current search block is applied to candidate block formation sections 20-1 to 20-m, wherein said m number of candidate blocks of H×V pixels are generated from the search region data. In the candidate block formation sections 20-1 to 20-m, each of relative displacement vectors, D(k,l), between pixels in each of the candidate blocks in a search region and their corresponding pixels in the current search block is obtained and provided to a multiplexer(MUX) 70 through lines L30-1 to L30-m, respectively. Pixel data for each of the candidate blocks is provided from the candidate block formation sections 20-1 to 20-m to their corresponding mean value subtraction sections 40-1 to 40-m, respectively.

At each of the mean value subtraction sections, 40-1 to 40-m, mean values of the search block and each of the candidate blocks are first calculated, wherein each mean value represents a mean luminance level of all the pixels within a search or a candidate block. And then, the mean value of the search block is subtracted from a luminance level of each pixel therein to generate a differential pixel. A fictitious search block comprised of the differential pixels shall be called a differential search block. Similarly, each mean value for each of the candidate blocks is subtracted from a luminance level of each pixel in a candidate block to generate a differential pixel for constituting a differential candidate block, which will be comprised of such differential pixels. The differential search block and each of the differential candidate blocks from each of the mean value subtraction sections 40-1 to 40-m are provided to their corresponding block matching sections 50-1 to 50-m, respectively.

At each of the block matching sections 50-1 to 50-m, each of the error functions between a differential search block and each of the differential candidate blocks is calculated by employing the MSE or MAE function expressed as follows:

$$MSE = \frac{1}{H \times V} \sum_{i=1}^{H} \sum_{j=1}^{V} ((I(i,j) - MI) - (P(i,j) - MP))^2 \quad \text{Eq. 2}$$

or $$MAE = \frac{1}{H \times V} \sum_{i=1}^{H} \sum_{j=1}^{V} |(I(i,j) - MI) - (P(i,j) - MP)|$$

wherein H×V represents the size of a search block; I(i,j) represents a luminance level of a pixel at a pixel position (i,j) in the search block; P(i,j) represents a luminance level of a pixel at a pixel position (i,j) in a candidate block; MI represents a mean luminance level of the pixels within the search block; and MP represents a mean luminance level of the pixels within the candidate block.

All the error functions from the block matching sections 50-1 to 50-m are supplied to a minimum error detector 60, wherein all the error function values are compared with each other and a smallest error function value is selected to provide a selection signal, which indicates the candidate block corresponding to the differential candidate block yielding the minimum error function, to the multiplexer (MUX) 70.

In response to the selection signal, the MUX 70 chooses the displacement vector of the candidate block, which corresponds to the differential candidate block yielding the minimum error function, to provide it as the motion vector for the search block.

While the present invention has been shown and described with respect to the particular embodiments, it will be apparent to those skilled in the art that many changes and modifications may be made without departing from the spirit and scope of the invention as defined in the appended claims.

What is claimed is:

1. A method for detecting motion vectors between a current frame and a previous frame of video signals by using a block matching motion estimation technique, wherein the current frame is divided into a plurality of search blocks of an identical size and the previous frame is divided into a corresponding number of search regions, each search region being divided into a multiplicity of candidate blocks of a size identical to that of the search block, which comprises the steps of:

(a) producing a plurality of differential search blocks, wherein each differential search block includes differential pixels, each differential pixel in said each differential search block having a difference value between a luminance level of each pixel in a search block and a mean luminance level of the pixels in the search block;

(b) producing a multiplicity of differential candidate blocks, wherein each differential candidate block includes differential pixels, each differential pixel in said each differential candidate block having a difference value between a luminance level of each pixel in a candidate block and a mean luminance level of the pixels in the candidate block;

(c) motion-estimating a search block with respect to each of the candidate blocks associated with a corresponding search region to produce displacement vectors corresponding thereto and motion-estimating a differential search block with respect to each of the differential candidate blocks associated with a corresponding search region to produce error functions corresponding thereto, each of the displacement vectors representing displacements between the pixels in the search block and their corresponding pixels in each of the candidate blocks, and each of the error functions being calculated based on differences between luminance levels of the differential pixels in the differential search block and those of their corresponding differential pixels in each of the differential candidate blocks; and (d) choosing a minimum error function to define a displacement vector corresponding to the minimum error function as a motion vector for the search block.

2. The method according to claim 1, wherein said error function is a mean square error.

3. The method according to claim 1, wherein said error function is a mean absolute error.

* * * * *